United States Patent
Kuckes (10) Patent No.: US 10,132,157 B2
(45) Date of Patent: Nov. 20, 2018

(54) SYSTEM FOR DRILLING PARALLEL WELLS FOR SAGD APPLICATIONS

(71) Applicant: Halliburton Energy Services, Inc., Houston, TX (US)

(72) Inventor: Arthur F. Kuckes, Ithaca, NY (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 634 days.

(21) Appl. No.: 14/647,748

(22) PCT Filed: Dec. 6, 2013

(86) PCT No.: PCT/US2013/073681
§ 371 (c)(1),
(2) Date: May 27, 2015

(87) PCT Pub. No.: WO2014/089490
PCT Pub. Date: Jun. 12, 2014

(65) Prior Publication Data
US 2015/0308260 A1  Oct. 29, 2015

Related U.S. Application Data

(60) Provisional application No. 61/734,711, filed on Dec. 7, 2012.

(51) Int. Cl.
*E21B 47/02* (2006.01)
*E21B 47/022* (2012.01)
(Continued)

(52) U.S. Cl.
CPC .......... *E21B 47/02216* (2013.01); *E21B 7/04* (2013.01); *E21B 43/2406* (2013.01);
(Continued)

(58) Field of Classification Search
CPC .. E21B 47/02216; E21B 47/122; E21B 47/04; E21B 43/305; G01V 3/26; G01V 3/30
See application file for complete search history.

(56) References Cited

U.S. PATENT DOCUMENTS 2,411,696 A * 11/1946 Silverman ............. E21B 47/122
175/50
4,323,848 A    4/1982 Kuckes
(Continued)

FOREIGN PATENT DOCUMENTS

CN    2305485 Y    1/1999
CN    1966935 A    5/2007
(Continued)

OTHER PUBLICATIONS

US 8,220,562, 07/2012, Kuckes (withdrawn)
(Continued)

*Primary Examiner* — Matthew R Buck
*Assistant Examiner* — Aaron L Lembo (57) ABSTRACT

A system for ranging between two wellbores. The target wellbore includes a conductive body (e.g., casing) disposed within a portion of the target wellbore. A second wellbore includes an electromagnetic field sensing instrument positioned within the wellbore. A current delivered to the conductive body in the target wellbore results in a magnetic field emanating from the target wellbore. The electromagnetic field sensing instrument is utilized to measure an electromagnetic gradient based on the magnetic field, which electromagnetic gradient can be utilized to determine the range between the wellbores.

28 Claims, 7 Drawing Sheets

(51) Int. Cl.
  *E21B 7/04* (2006.01)
  *E21B 43/24* (2006.01)
  *E21B 43/30* (2006.01)
  *G01V 3/26* (2006.01)
  *G01V 3/30* (2006.01)

(52) U.S. Cl.
  CPC ...... *E21B 43/305* (2013.01); *E21B 47/02224* (2013.01); *G01V 3/26* (2013.01); *G01V 3/30* (2013.01)

(56) References Cited

U.S. PATENT DOCUMENTS

| | | | |
|---|---|---|---|
| 4,933,640 A * | 6/1990 | Kuckes | E21B 47/02216 166/66.5 |
| 5,218,301 A | 6/1993 | Kuckes | |
| 5,305,212 A * | 4/1994 | Kuckes | G01V 3/26 324/346 |
| 5,343,152 A | 8/1994 | Kuckes | |
| 5,676,212 A | 10/1997 | Kuckes | |
| 6,631,563 B2 | 10/2003 | Brosnahan et al. | |
| 7,202,671 B2 * | 4/2007 | Strack | G01V 3/24 324/355 |
| 7,568,532 B2 | 8/2009 | Kuckes et al. | |
| 8,069,932 B2 | 12/2011 | Kamata | |
| 8,272,447 B2 | 9/2012 | Lee et al. | |
| 8,307,915 B2 | 11/2012 | Clark et al. | |
| 8,322,462 B2 | 12/2012 | Kuckes | |
| 9,562,988 B2 * | 2/2017 | Wilson | |
| 9,714,563 B2 * | 7/2017 | Wilson | E21B 43/2406 |
| 9,803,466 B2 * | 10/2017 | Donderici | E21B 47/0006 |
| 9,810,059 B2 * | 11/2017 | Ahmad | E21B 41/0085 |
| 2004/0250614 A1 | 12/2004 | Ander | |
| 2007/0074872 A1 | 4/2007 | Du et al. | |
| 2007/0278008 A1 * | 12/2007 | Kuckes | E21B 47/02216 175/40 |
| 2008/0000686 A1 * | 1/2008 | Kuckes | E21B 47/02216 175/24 |
| 2009/0178850 A1 * | 7/2009 | Waters | E21B 7/04 175/45 |
| 2009/0272578 A1 | 11/2009 | MacDonald | |
| 2010/0044108 A1 * | 2/2010 | Bespalov | E21B 47/022 175/24 |
| 2010/0155139 A1 | 6/2010 | Kuckes | |
| 2011/0006773 A1 | 1/2011 | Bittar | |
| 2012/0212229 A1 * | 8/2012 | Sinclair | G01V 3/28 324/345 |
| 2013/0032404 A1 * | 2/2013 | Donderici | E21B 47/024 175/45 |
| 2015/0219783 A1 * | 8/2015 | Sitka | E21B 23/06 324/326 |

FOREIGN PATENT DOCUMENTS

| | | |
|---|---|---|
| CN | 10109924 A | 1/2008 |
| CN | 101421483 A | 4/2009 |
| CN | 101627176 A | 1/2010 |
| EP | 1967689 A2 | 9/2008 |
| EP | 1967689 A2 | 9/2008 |
| WO | WO-2007145859 A2 | 12/2007 |

OTHER PUBLICATIONS

The State Intellectual Property Office of the People's Republic of China, Office Action, dated Sep. 2, 2016, 8 pages, China.
The State Intellectual Property Office of the People's Republic of China, Search Report, dated Sep. 2, 2016, 2 pages, China.
European Patent Office, Supplementary European Search Report, dated Nov. 21, 2016, 7 pages, Europe.
Australian Examination Report, dated Dec. 16, 2015, AU Patent Application No. 2013355049, 3 pages.
The Federal Institute of Industrial Property, Office Action, English Translation, dated Apr. 26, 2016, 5 pages, Russia.
International Search Report and The Written Opinion of the International Searching Authority, or the Declaration, dated Apr. 17, 2014, PCT/US2013/073681, 10 pages, ISA/US.
Canadian Intellectual Property Office, Office Action, dated May 2, 2018, 4 pages, Canada.

* cited by examiner

SYSTEM FOR DRILLING PARALLEL WELLS FOR SAGD APPLICATIONS

PRIORITY

The present application is a U.S. National Stage patent application of International Patent Application No. PCT/US2013/073681, filed on Dec. 6, 2013, which claims priority to U.S. Provisional Application No. 61/734,711 entitled, "SYSTEM FOR DRILLING PARALLEL WELLS FOR SAGD APPLICATIONS," filed Dec. 7, 2012, naming Arthur F. Kuckes as inventor, the disclosures of which are hereby incorporated by reference in their entirety.

FIELD OF THE DISCLOSURE

The present disclosure generally relates to wellbore drilling operations, and more particularly, to methods and systems for tracking the drilling of multiple wellbores relative to one another. Most particularly, embodiments of this disclosure relate to methods and systems for determining the relative location of a target wellbore from a wellbore being drilled utilizing a magnetic gradiometer in the wellbore being drilled, as well as optimized placement of emitter electrodes and return electrodes to enhance magnetic ranging.

BACKGROUND

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Preferably, the two wellbores are drilled at a distance of only a few meters from one other. The placement of the injector wellbore needs to be achieved with very small margin in distance. If the injector wellbore is positioned too close to the producer wellbore, the producing wellbore would be exposed to very high pressure and temperature. If the injector wellbore is positioned too far from the producer wellbore, the efficiency of the SAGD process is reduced. In order to assist in ensuring that the second wellbore is drilled and positioned as desired relative to the first wellbore, a survey of the two wellbores in the formation is often conducted. These surveying techniques are traditionally referred to as "ranging".

One solution that has been employed in ranging is to use ranging devices to directly sense and measure the distance between two wells as the latter wellbore is drilled. Two wellbore-known commercial approaches that employ equipment in both wells (injector and producer) are based either on rotating magnets or magnetic guidance techniques. However, these approaches are undesirable in that they require two separate and different teams to manage the equipment in each wellbore, namely, a wireline team at the producer wellbore and a logging while drilling team at the injector wellbore, which is not cost effective. One prior art approach utilizes equipment in only a single wellbore (the injector wellbore) to transmit a current to a target wellbore (the producer wellbore), after which an absolute magnetic field measurement is used to calculate distance.

DESCRIPTION OF ILLUSTRATIVE EMBODIMENTS

Illustrative embodiments and related methodologies of the present disclosure are described below as they might be employed in a ranging system and method for tracking the drilling of multiple wellbores relative to one another. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
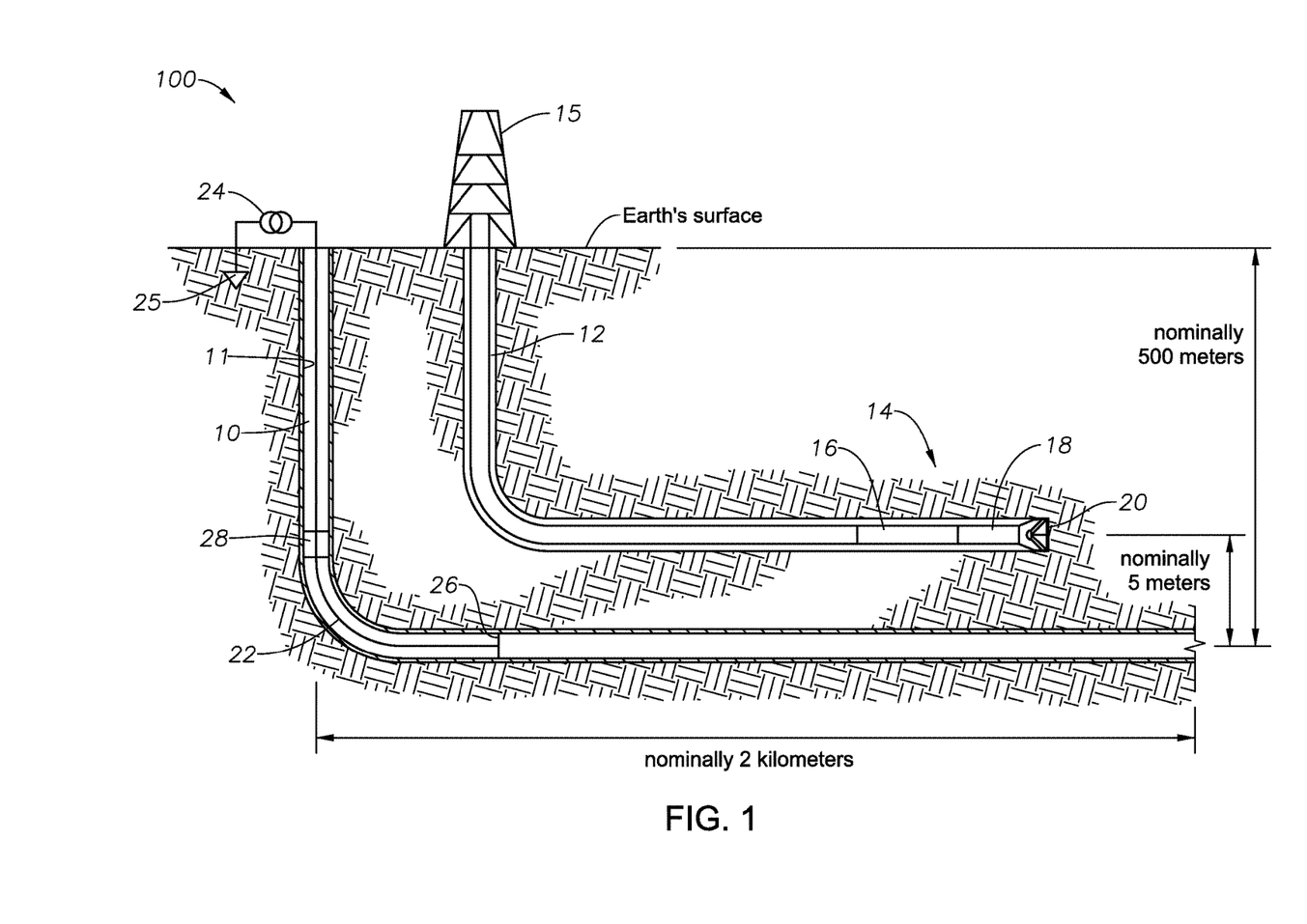
FIG. 1 shows a SAGD drilling system according to certain illustrative embodiments of the present disclosure.

FIG. 1 illustrates a SAGD drilling system 100 according to an illustrative embodiment of the present disclosure. In this embodiment, a target wellbore 10 is drilled using any suitable drilling technique. Thereafter, target wellbore 10 is cased with casing string 11. An injector wellbore 12 is then drilled using BHA 14 which extends from derrick 15, as understood in the art. BHA 14 may be, for example, a logging-while drilling ("LWD") assembly, measurement-while drilling assembly ("MWD") or other desired drilling assembly. As such, BHA 14 further includes a drilling motor 18 and drill bit 20. Although injection wellbore 12 is described as being subsequently drilled, in other embodiments target wellbore 10 and injection wellbore 12 may be drilled simultaneously. Moreover, in yet another alternate embodiment, BHA 14 may be embodied as a wireline application (without a drilling assembly) performing logging operations, as will be understood by those same ordinarily skilled persons mentioned herein. In this exemplary embodiment, the BHA/drilling assembly 14 includes a sensor sub 16 having one or more electromagnetic sensors and circuitry for data communication to and from the surface, as will be described in more detail below.

Generally, the method of the present disclosure includes producing a low frequency alternating current on casing string 11 of target wellbore 10 by a direct connection to an electric current supply (e.g., AC power supply) to the target wellbore 10 during periodic interruptions in the drilling of the wellbore being drilled, i.e., the injection wellbore 12. During these interruptions, measurements are taken at multiple selected depth intervals with instruments near the drill bit 20 in the injection wellbore 12, the measurements including the magnitude, the direction and the radial gradient of the magnetic field produced by the current flow on the target wellbore 10. At the same time, measurements are made of the magnitude and the direction of the Earth's field and of the direction of gravity in the wellbore being drilled, e.g. by an MWD (measurement while drilling) tool along BHA 14 to determine the roll angle and inclination of the drilling wellbore. Including information derived from standard MWD measurements, the distance and the direction between the injection wellbore 12 and target wellbore 10 and the left/right direction of drilling (if the wells are in an approximately vertical plane with each other) can be determined using the apparatus and method disclosed.

More particularly, and in accordance with certain illustrative embodiments of the present disclosure, an electric current flow is produced in casing string 11 of the target wellbore 10 by injecting time-varying current via the use of an electric current supply (e.g., electrode (not shown)) disposed in the target wellbore 10 or by direct connection, either at the surface or down-hole location in that wellbore, as shown in FIG. 1. Current returned at the Earth's surface is done either by use of a connection 22 to a surface electrode 24 or a nearby well head. Connection 22 may be, for example, an insulated wireline coupling electrode 24 (or some other AC current source, for example) to an electrical connection 26 connected to casing 11. The current injected into the target wellbore 10 bleeds off exponentially with distance away from the injection point. If current is injected at the well head, it bleeds off exponentially from that point. If current is injected into wellbore 10 from a down-hole electrode, the current bleeds off in both directions from that point, and the net current available for electromagnetic field generation can be computed using well known principles.

To enhanced current on the target wellbore 10 near the depth of measurement, an insulating section 28 in that wellbore may be included as shown in FIG. 1, either on one (as shown) or both sides (not shown) of the target area of investigation. Thus, in one preferred embodiment, a non-conductive element, insulator, gap or insulating section of casing may be disposed in the target wellbore upstream of the current injection point, thus serving as insulating section 28.

The electromagnetic field sensing instrument housed in sensor sub 16 is extremely sensitive to the electromagnetic fields and most importantly to the radial gradient of the electromagnetic field in the wellbore being drilled (i.e., injection wellbore 12). For one application of interest i.e., the drilling of SAGD wells, the radial gradient across the injection wellbore 12 is intrinsically about 50 times less than electromagnetic field itself, i.e., the ratio of the 7 meter desired range and the diametrical size of the electromagnetic gradient measuring instrument. Thus, a distance measurement with 5% precision preferable utilizes electromagnetic sensors along sub 16 which have an intrinsic 1/1000 resolution, stability and signal to noise rejection. Such precision is desired not only for eventual oil production requirements, but also to enable the driller to drill a dog leg free wellbore, i.e., a straight bore hole as opposed to a spiral or s-shaped wellbore, as is also required for easy deployment of steel casing in the injection wellbore 12.

The use of direct current injection into the target wellbore 10 has several advantages over the prior art method of inducing current flow on a target wellbore by way of a remote electrode or electrode pair disposed in the wellbore being drilled. When current is injected directly into the target wellbore 10, the dominant current flow in the vicinity of the electromagnetic sensors near the drill bit 20 is from the current flowing on the target wellbore 10 itself. However, in the prior art, when current is injected into the target wellbore remotely through the Earth formation by means of an electrode or electrodes in the wellbore be drilled, the opposite is true since typically only a few percent of the current injected into the Earth transfers to the target wellbore in the vicinity of the sensors. The dominant current flow in this case is in the vicinity of the sensors is in the Earth and wellbore surrounding the wellbore being drilled. Because of the axial symmetry around the wellbore being drilled the electromagnetic field generated by these Earth currents, in an idealized configuration is zero. However, given that a 1 part in 1000 measurement specification, non-ideal formation properties and down hole drilling assembly location in the wellbore can be bad.

Figure 2A:
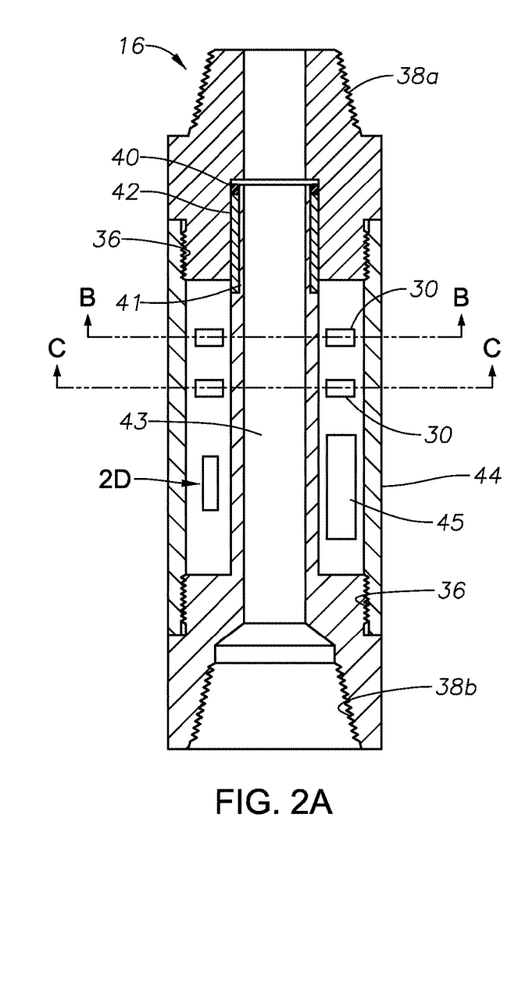
FIG. 2A illustrates a schematic view of a sensor sub, according to an illustrative embodiment of the present disclosure.
Figure 2B:
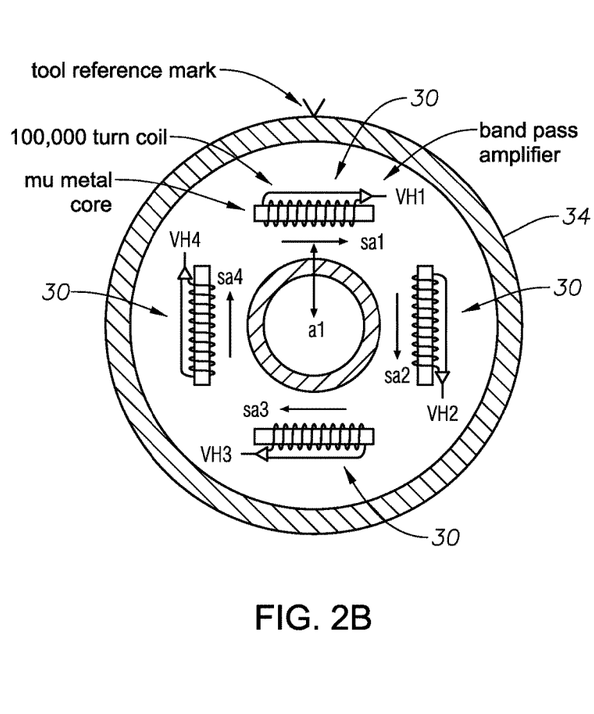
FIGS. 2B and 2C illustrate a cross-sectional view of a sensor sub along lines B and C of FIG. 2A, respectively.
Figure 2C:
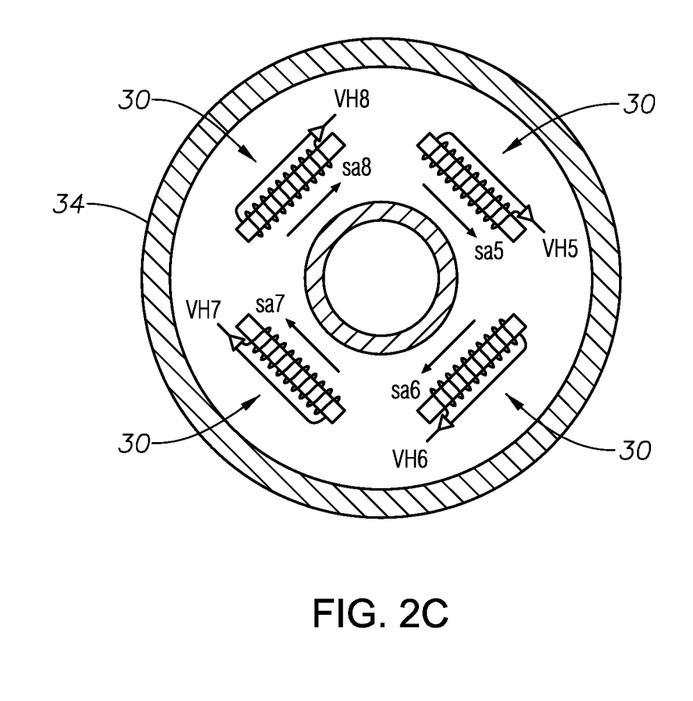
Figure 2D:
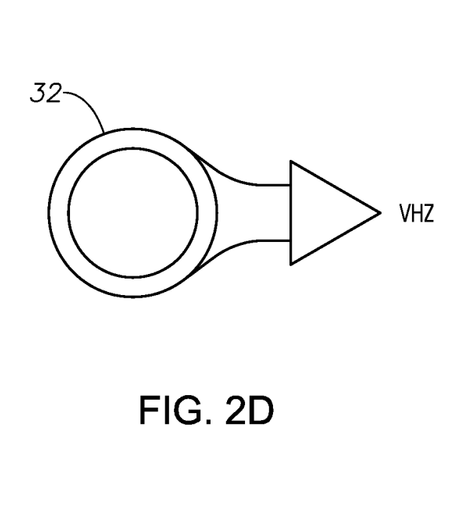
FIG. 2D illustrates a cross-sectional view of a z-axis sensor.

FIG. 2A illustrates a schematic view of sensor sub 16, according to an illustrative embodiment of the present disclosure. FIGS. 2B and 2C illustrate a cross-sectional view of sensor sub 16 along lines B and C, respectively. FIG. 2D illustrates a cross-sectional view of a z-axis sensor. Sensor sub 16, also referred to herein as an electromagnetic field sensing instrument or magnetic gradiometer, being disclosed herein has desirable properties for making a good measurement of the radial electromagnetic field gradient. In certain illustrative embodiments, such a system includes at least three electromagnetic field sensors, separated from each other, with axes of sensitivity perpendicular to the longitudinal axis of the tool. It is preferable for the system to consist of 8 primary electromagnetic field component sensors 30, e.g., of 8 fluxgates or 8 induction coils as shown in FIGS. 2B and C with axes of sensitivity perpendicular to the drilling axis and located as far radially as possible from the axis of the drilling tool as the bottom hole drilling assembly diameter will allow. These sensors 30 are located 45 degrees with respect to each other around the drilling axis. Such a configuration gives an optimized response to the radial electromagnetic field gradient. In addition, a "z" axis electromagnetic field sensor 32 is included for the purpose of determining the relative left/right drilling direction with respect to the direction of the target wellbore. Incorporation of a "z" axis sensor 32 is also helpful for compensating for the effects of axial components of the electromagnetic field which may be present. Z axis sensor 32 is perpendicular to sensors 30 and parallel to the primary axis of sensing sub 16.

As previously described, two features of the illustrative embodiments of this disclosure are the method and apparatus for generating electric current flow on the target wellbore and the magnetic gradiometer disposed in the injector wellbore. With respect to generating electric current flow on the target wellbore 10, preferably low frequency, (approximately 1 to 30 Hertz, for example) electric current with between 5 and 30 amperes rms is provided by the current source 24 shown if FIG. 1. The current return wire (not shown) is connected to a distant return electrode (not shown) and the live end to the target wellbore 10. In certain embodiments, this may be accomplished by a clamp to the well head itself, or to a ground electrode as close as possible to the well head.

An alternative embodiment, as shown in FIG. 1, utilizes an insulated wire 22 and an electrode (at electrical connection 26) going as deeply as is convenient into the wellbore 10 to establish electrical contact with the casing of the reference or target wellbore 10. In this alternative embodiment, as mentioned above, an optional insulating section 28 in the casing string 11 may also be included to force more current in to the vicinity of the measurement depth. In yet another alternative embodiment, current is injected into the target wellbore 10 using a ground stake 25 in the immediate vicinity of the surface location of the target wellbore 10. For example, at a distance of 2 km into the wellbore, 3% or more of the current injected can be expected. Tests have shown that for wells spaced apart only a short distance, for example, 7 meters, this is a sufficient amount of current for the magnetic gradiometer apparatus of this disclosure to function.

Although certain embodiments of the disclosure are not limited to a particular electromagnetic field gradiometer, one preferred embodiment of an electromagnetic field gradiometer (i.e., sensor sub 16) is shown schematically in FIGS. 2A-2D, utilizing two boards 34 having 8 sensors 30. It can be shown that use of a single board 34 with 4 symmetrically located sensors 30 (as for example, the upstream board of FIG. 2B with 4 sensors as shown) equally spaced about a center axis will result in magnetic gradient field data with "blindspots" every 90°. Thus, in the embodiment illustrated in FIGS. 2A-2D, 9 induction coil or flux gate sensors 20,32, or their equivalent, are carried by sensor sub 16, with 8 electromagnetic field sensors 30 and one z-axis sensor 32. This illustrative configuration optimizes signal to noise and also rejects unwanted "spurious" signals, e.g. those associated with tiny electric current flow on the central core of the instrument.

The induction coil sensors and microprocessor in the MWD unit of BHA 14 generate output demodulated DC voltages V1 . . . V8 (8 sensors 30) and VZ (sensor 32) which represent the amplitude ac voltages VH1 . . . VHZ produced by electromagnetic field and amplifiers. The sensors 30, or at least pairs of sensors, are preferably identical. In certain embodiments, each coil is preferably about 0.1 meters long and has approximately 100,000 turns of wire. Each coil is preferably connected to circuitry (not shown) which includes a low noise, high gain, band pass amplifier. The amplifier voltages are fed individually into a downhole microprocessor for analysis. The first step in the analysis is to use synchronous demodulation to generate DC voltage outputs V1 . . . V8 and VZ for each of the ac voltages, which voltages are proportional to the amplitude of the electromagnetic field projection on the sensor axis at each sensor site. The sensors and their amplifiers produce ac voltages VH1 . . . VH8 and VHz shown in FIGS. 2A-2D, the output of sensor number "x" is equal to:

$$VHx = Gainx * dot(Hlocx, sax) \qquad Eq.1.$$

Hlocx is the electromagnetic field vector present at the location x where the sensor x is located, sax is a unit vector pointing in the direction of sensitivity of sensor x and the function dot(y,z) is the vector dot product of the vectors y and z. Gainx is the ratio of the voltage output of amplifier "x" and the electromagnetic field projection in the direction sax being measured.

In certain illustrative embodiments, sensors 30 are spaced symmetrically on a board 34 or boards 34. In the illustrated embodiment, VH1 . . . VH4 are mounted symmetrically on a first board 34 with locations 90 degrees apart and axes of sensitivity unit vectors sa1 . . . sa4 each at a distance "ax" from the center of the drilling sub 16 as indicated. Likewise, sensors VH5 . . . VH8 are mounted symmetrically on a second board 34 with locations 90 degrees apart. This second board 34 is mounted slightly below the first board 34 such that, for example, the sensors 30 of the second board are at an angle of 45 degrees relative to sensors 30 of the first board. The sensor VHz is mounted below the VH1 . . . VH8 boards. Also shown schematically are the standard MWD sensors and the associated electronics for the entire system. It should be further noted that each pair of sensors 30 can be on the same plane as shown, or different planes.

The mechanical construction of this sub as shown in FIG. 2A has threaded connections 36 for assembly and disassembly and pin 38a and box 38b threads for connecting to the drill string. The central axis connection within the drilling sub 16 is sealed with O-rings 40 and also has an electrically insulating sleeve 42 to inhibit electric current flow on the central axis of the sub 16. Small electric currents on the outer shell of the sub 16, to a first approximation, produce no electromagnetic field inside where the sensors 30 are located. Though the illustrative sensor configuration and method of analysis being disclosed are not responsive to current flow on the central core 43, in general even a tiny current on the central core 43 of the sub 16 can impact operation. Therefore, inhibiting such current flow with an insulating sleeve 42 and "O" ring 40 is advantageous. It will be appreciated that insulating sleeve 42 forms an insulating gap 41 between core 43 and sensors 30. In addition, it is important to house the sensor assembly in an axially symmetric housing 44 with uniform wall thickness. A small electric current flow on the outer wall of such housing produces no field on the inside where the sensors 30 are located. The sub also includes a module 45 which contains, in this example, sensors (MWD gravity earth field sensors, e.g.), data communication and integrated electronics for the entire tool.

Figure 3:
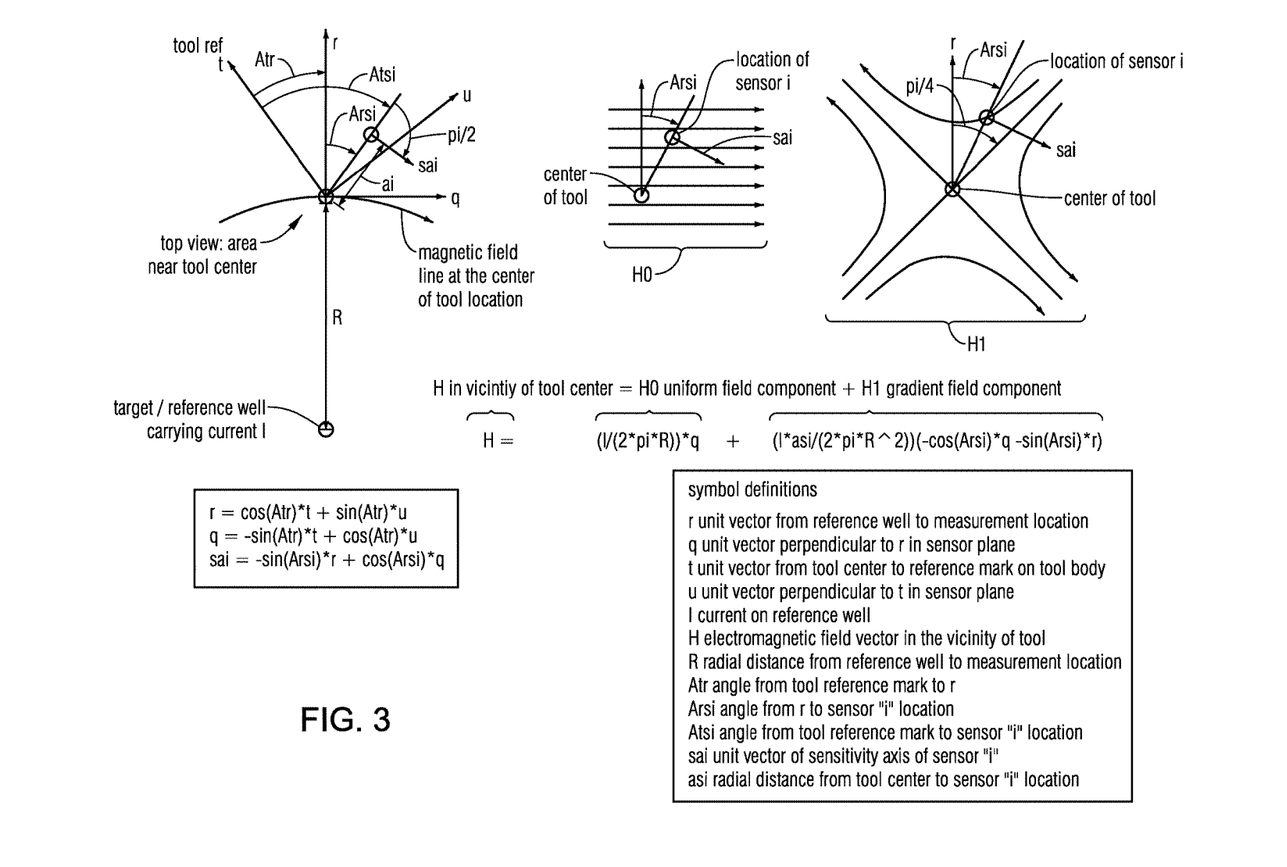
FIG. 3 is a diagrammatic display of relevant electromagnetic field quantities and symbol definitions, according to certain illustrative embodiments of the present disclosure.

FIG. 3 illustrates relevant electromagnetic filed quantities and symbol definitions, according to certain illustrative embodiments of the present disclosure. The current flow produced on the target wellbore 10 generates an electromagnetic field in the vicinity of the electromagnetic sensors 30. To a good approximation, this electromagnetic field circulates about the target wellbore 10 in accordance with the well-known right hand rule. Also, the primary H0 uniform field inside the tool is given by $1/(2*pi*R)$, where I is the current in amperes on the target wellbore opposite the sensors, pi=3.14156, and R is the center to center radial distance from the target wellbore 10 to the drilled wellbore 12 (e.g., injection wellbore) at the depth of measurement.

The detailed magnetic field generated is illustrated in FIG. 3. In the very close vicinity of the axis of the measuring tool (i.e., sensor sub 16), the "circular" electromagnetic field is conveniently represented in a "normal mode" field decomposition as the sum of two components. The first is the that of a uniform field H0 is in the direction of the unit vector q, i.e., $$H0=(1/(2*pi*R))*q. \quad \text{Eq. 2}$$

The second component describes the field "correction" due to the facts that the field lines are curving and that the field is falling off as 1/R. At a radial distance "a" from the center of the measuring tool at an angle Ars, i.e., the angle from the unit radial vector from the target wellbore 10 to the electromagnetic sensor location, the correction component of the field H1 is given by:

$$H1=(1/(2*pi*R)*(a/R)*(-\cos(Ars)*q-\sin(Ars)*r). \quad \text{Eq. 3}$$

The voltage output V1 of a sensor at this location is given by:

$$VH=\text{Gain}*\text{dot}(H,sa) \quad \text{Eq. 4,}$$

where dot(H,sa) is the projection of H on the sensitivity axis sa of the sensor. Gain is the ratio the electronic gain of the amplifier combined with the coil voltage response and dot(H,sa).

To present the underlying physical principles of an illustrative method, consider the schematized representations of the sensors shown in FIGS. 2A-2D and the electromagnetic field representations in FIG. 3. The "Gain" factor indicated in Eq. 4 is taken to be equal to 1 for this discussion. Using the relations for the unit vectors r, u, sa for idealized sensor locations as indicated in FIGS. 2 and 3, and trigonometric identities, the following relations of various linear combinations of the synchronously demodulated voltages V1 . . . V8, VZ can be computed to give the following:

$$VHc1=V1-V3+0.707*(V8+V5-V6-V7)=(4*I/(2*pi*R))*\cos(Atr)VHs1=V8-V6+0.707*(V4+V1-V2-V3)=(4*I/(2*pi*R))*\sin(Atr)VHc2=-V1-V3+V2+V4)=(4*I*a/(2*pi*R^2))*\cos(2*Atr)VHs2=V5+V7-V6-V8)=(4*I*a/(2*pi*R^2))*\sin(2*Atr)VZ=(I/(2*pi*R))*\sin(ACurZ). \quad \text{Eq.5}$$

$$Atr=a\tan 2(VHs1,VHc1)R=a*\text{sqrt}((VHc1^2+VHs1^2)/(VHc2^2+VHs2^2))I/(2*pi*R)=(\tfrac{1}{4})*\text{sqrt}(VHc1^2+VHs1^2)ACurZ=a\sin((2*pi*R/I)*VZ). \quad \text{Eq. 6}$$

Figure 4:
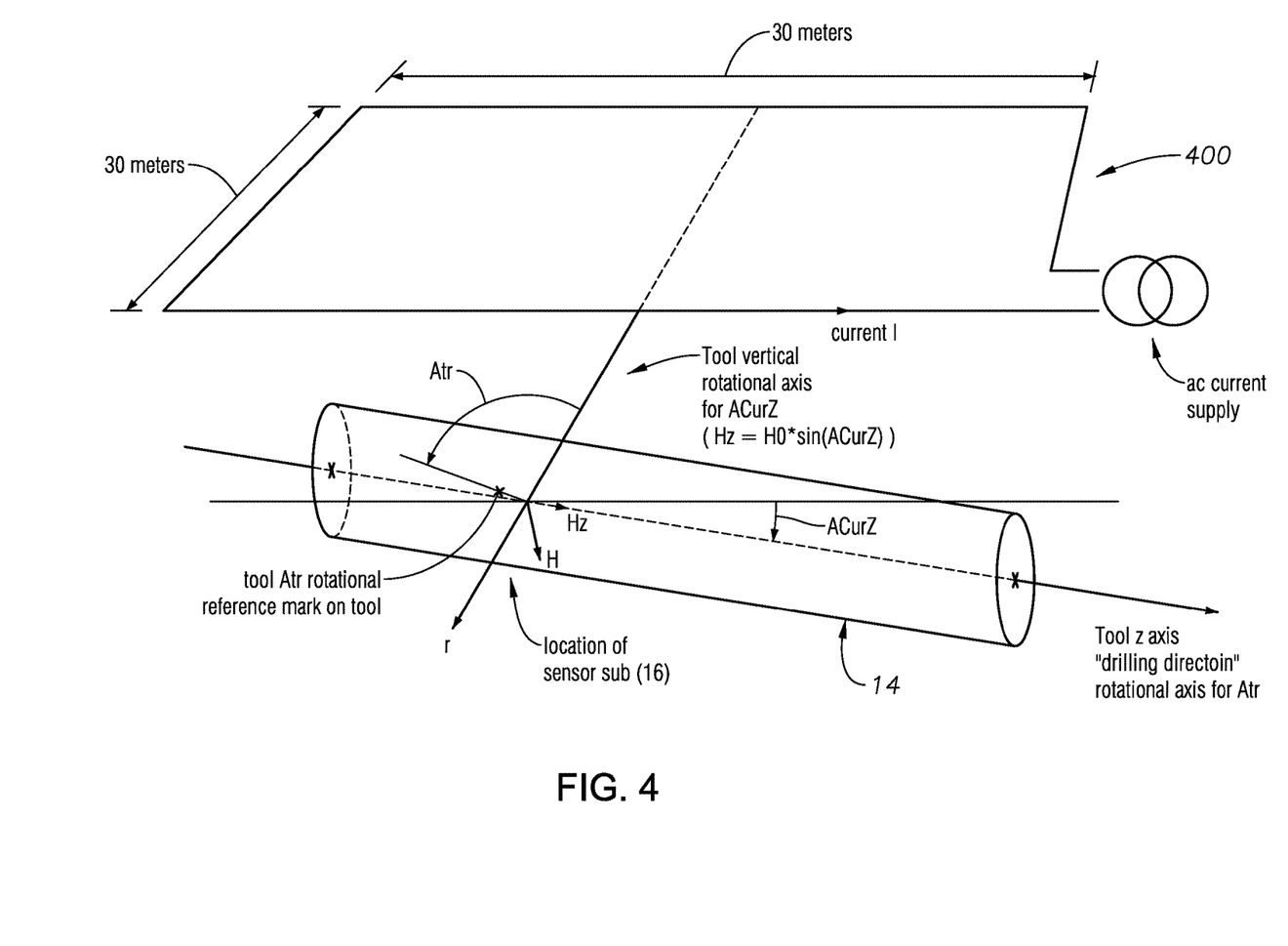
FIG. 4 shows a bottom hole tool assembly and apparatus for calibrating the magnetic gradient tool of the sensor sub, according to certain illustrative embodiments of the present disclosure.

The angle ACurZ is defined in FIG. 4. Here, it is the angle between Hz and H as shown in FIG. 4. It is also a component of the angle between the "drilling" direction and the reference/target wellbore. The above relations give a procedure for computing the roll angle Atr between the tool reference mark and r, the angle between Hz and H (the angle ACurZ) and the distance R between the tool and the target wellbore as shown in FIGS. 2A-2D. The direction of the tool reference mark and direction t shown in FIG. 3 in the Earth and the location of the MWD tool itself are readily found using standard analyses of MWD gravity and Earth magnetic field sensors measurements (which may be acquired using module 45 in FIG. 2A). Using well known principles of vector addition, these MWD determinations can be combined with the above determinations of R and the angles Atr and ACurZ to find the direction and the location in space of the electromagnetic field source point on the target wellbore defined.

It is also important to note, that to a good approximation, a small z component to the electromagnetic field or a small uniform "azimuthal" field component circulating the central core does not give a contribution to the 5 voltage combinations VHc1, VHs1, VHs2, and VZ defined by Eq. 5.

Turning to another important aspect of the disclosure, imperfections in tool manufacture can affect response voltages V1 . . . V8 VZ. Since precise response voltages V1 . . . V8 VZ are required for the analysis defined by Eq. 5 and Eq. 6, tool imperfections must be compensated. Conventionally, this has been accomplished by mechanical and electrical "trimming" methods in the tool. In certain illustrative embodiments of this disclosure, however, a better computational method is disclosed. Instead of compensating and calibrating each sensor individually, as has been practiced in the prior art, an overall system and method will be disclosed which relates the measurements of a set of sensor voltages measured in a given deployment of the tool directly to the desired quantities, i.e., the distance to the target wellbore, the direction to the target wellbore and the relative "left/right" direction of drilling and the axial direction of the target wellbore. In one embodiment, this will be done by using a Tool Matrix ("TlMat") which characterizes the overall tool behavior.

To illustrate this illustrative method of the disclosure, applying the method to a tool with 9 sensors will be carried out. The method of the disclosure is not limited to a particular number of sensors and is readily adapted to tools having other numbers of sensors, such as for example, 4 or 6 sensors. It is also applicable if no z sensor is included in the instrument. An important point is that the method is based only upon properties of the overall behavior of the tool to the electromagnetic fields in its vicinity. The specifics of its construction, certainly influence the quality of performance, however these specifics of construction do not enter into the method being disclosed to determine the parameters of interest from the tool voltage response values.

There are several important points to note at the outset. The first is that a sensor develops a voltage proportional to the projection of the electromagnetic field at the sensor location upon the axis of sensitivity of the sensor. This has the consequence that as the tool is rotated around its longitudinal z axis, in a uniform electromagnetic field H, perpendicular to the axis of rotation, the voltage developed is proportional to the field strength H and to cos(Atr-offset). This offset angle is related to the orientation of the sensor with respect to the tool and its location in the tool. Thus, the voltage V of a sensor to such a uniform field perpendicular to the axis of the tool can be written as:

$$V = A*H*\cos(Atr - \text{offset}) \quad \text{Eq. 7}$$
$$= A*H*(\cos(\text{offset})*\cos(Atr) + \sin(\text{offset})*\sin(Atr))$$
$$= B*(H*\cos(Atr))+C*(H*\sin(Atr))$$

A, B and C are proportionality constants related to the sensor gain and location and orientation in the tool. The important point to note is that rotation of the tool in a uniform field, perpendicular to the axis of rotation, can always be expressed a linear combination of terms proportional to cos(Atr) and sin(Atr).

Similarly rotating a sensor in the gradient component of the field, which has the characteristic "hyperbolic" field line shape indicated in FIG. 3, leads to a voltage proportional to a linear combination of terms proportional to cos(2*Atr) and sin (2*Atr). To see how this comes about, consider a sensor "i" shown in FIG. 3 being rotated, i.e., angle Atsi is varied over 360 degrees. When Atsi is equal to an offset angle of about 40 degrees, which FIG. 3 indicates for sensor "i" shown, Arsi=0. When Atr=40 degrees, the sensitivity axis sai will be anti-parallel the field line H1 and will generate a voltage −Vi. Changing Atsi by 45 degrees, i.e., setting Atr=offset+45 degrees, makes sai perpendicular to the field line and Vi=0. When Atr=offset+90 degrees, the sensor output will be +Vi volts because sai and the field line both point in the same direction. Thus, as the rotation of Atr goes through 360 degrees, the output voltage will have go through 720 degrees. Thus, the voltage V developed from this "G"=dH/dR component of the field comes out to be:

$$V = D*(G*\cos(2*Atr)) + E*(G*\sin(2*Atr)) \quad \text{Eq. 8}$$

Here, D and E are proportionality constants related to constructional details of the tool. Similarly, if the sensor sensitivity axis is not perpendicular to the z axis of the tool, and an Hz component of the applied field is present, the sensor will generate a voltage which is independent of the rotation angle Atr, i.e., $$V = F*Hz = F*H*\sin(ACurZ) \quad \text{Eq. 9}$$

In a first step of the method following the above, we write the voltage output of a sensor V1 in matrix form as:

$$V1 = |H*\cos(Atr) \quad H*\sin(Atr) \quad G*\cos(2*Atr) \quad G*\sin(2*Atr) \quad Hz| * \begin{vmatrix} V1c1 \\ V1s1 \\ V1c2 \\ V1s2 \\ V1Hz \end{vmatrix} \quad \text{Eq. 10}$$

In this relationship, the quantities V1c1, V1s1, V1c2, V1s2, V1Hz are tool constants, i.e., effectively the constants B, C, D, E, and F considered above applied to sensor 1. The row vector HcsHz contains the physical quantities which characterize the electromagnetic field quantities (H and G) and the associated tool rotation angles (Atr) and ACurZ, i.e., the quantities which ultimately are determined from a set of tool sensor voltage measurements, one of which is V1.

The linear relationship above is readily extended to include all the sensor output voltages V1 . . . V8 VZ by appending columns as:

$$|V1 \quad V2 \ldots V8 \quad VZ| = \\ HcsHz | * \underbrace{\begin{vmatrix} V1c1 & V2c1 & V3c1 & V4c1 & V5c1 & V6c1 & V7c1 & V8c1 \\ VZc1 & & & & & & & \\ V1s1 & V2s1 & V3s1 & V4s1 & V5s1 & V6s1 & V7s1 & V8s1 \\ VZs1 & & & & & & & \\ V1c2 & V2c2 & V3c2 & V4c2 & V5c2 & V6c2 & V7c2 & V8c2 \end{vmatrix}}_{T1Mat} \quad \text{Eq. 11}$$

It is important to note that this formulation does not require the tool construction to closely conform to the idealized tool configuration as discussed with regard to Eq. 5 and Eq. 6. The requirement is that the Tool Matrix (TlMat) describe a set of mathematically independent equations.

If the Tool Matrix ("TlMat") defined above is known, the row vector of interest called "HcsHz" can be recovered. The Tool Matrix (TlMat) above is a table of numbers describing the voltage responses of the electromagnetic field sensor to an imposed uniform field+a gradient field+an Hz field. The numbers in the first column of TlMat express the voltage V1 as an algebraically linear sum of the quantities H*cos(Atr), H*sin(Atr), G*cos(2*Atr), G*sin(2*Atr) and Hz as expressed by equation 10. The second column of numbers in TlMat are the coefficients for the voltage of sensor 2, i.e., V2, and so on. The 1×5 row matrix HcsHz, of the applied physical quantities can be recovered from a set of measurements |V1 V2 . . . V8 VZ| using a variation of the least squares method. The row vector HcsHz can be found by applying a Recovery Matrix (RecMat) to a row vector of a set of sensor voltage measurement using the expression:

$$HcsHz = |V1\,V2 \ldots V8VZ|*RecMat \quad \text{Eq. 12}$$

where $$RecMat = TlMat'*inv(TlMat*TlMat) \quad \text{Eq. 13}$$

The 5 row by 9 column matrix RecMat ("Recovery Matrix") can be stored on the MWD processor, and the 5 quantities in HcsHz computed by the MWD processor for communication to the Earth's surface using the MWD wellbore data communication system. This illustrative equation notation, as others in this disclosure, follows that of the computer language MATLAB. Thus " ' " stands for matrix transpose, and the function inv(A) is the matrix inverse of a square matrix A. The technical computing language MATLAB and the computing environment in which it is embedded uses matrix manipulations for numerical problem solving, as will be understood by those ordinarily skilled in the art having the benefit of this disclosure.

From the 1×5 row matix HcsHz, the desired quantities can be recovered:

$$Atr = a\tan 2(HcsHz(2), HcsHz(1)) \, H = \sqrt{HcsHz(1)^2 + HcsHz(2)^2} \, R = H/(HcsHz(3)^2 + HcsHz(4)^2) \\ Hz = HcsHz(5) \, ACurZ = a\sin(Hz/H) \quad \text{Eq. 14}$$

These results are readily combined with the tool roll angle, inclination and azimuth orientation in space determinations using standard MWD measurements and methods of analysis, to give the direction in space and the relative longitudinal orientation of the target wellbore from the injection wellbore. Instead of sending HcsHz up hole through the MWD communication system it may be advantageous to compute some or all of the results shown in Eq. 15 downhole and to send the results of Eq. 14 to the Earth's surface.

FIG. 4 illustrates a simplified view of a bottom hole assembly and a horizontal calibrating loop 400 for calibrating the magnetic gradiometric tool (i.e., sensor sub 16). FIG.

Figure 5:
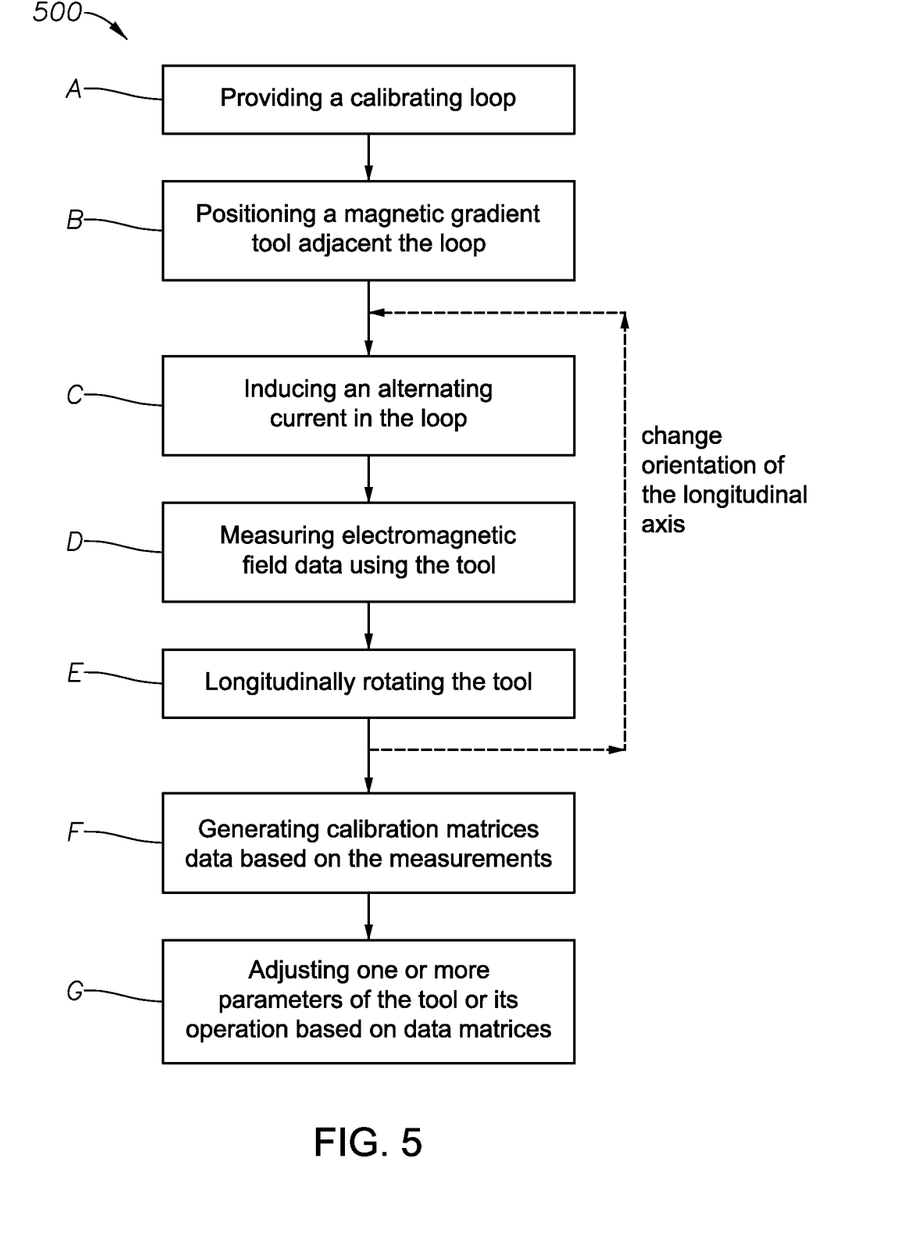
FIG. 5 is a flow chart of a calibration method for a magnetic gradient tool, according to certain illustrative methods of the present disclosure.

5 is a flow chart of a calibration method 500 for the magnetic gradient tool. With reference to FIGS. 4 and 5, the Tool Matrix TlMat can be found using the calibration apparatus (i.e., loop 400) shown in FIG. 4. Thus, in a block A (FIG. 5), a conductive calibration loop is provided. In certain illustrative embodiments, the calibration loop 400 is a square planar loop of wire approximately 30 meters long legs, with known corner locations carries a current of the same frequency and current magnitude expected during drilling operations. At block B, the tool is positioned adjacent to the loop with its center of sensitivity at a known location in the plane of the loop. The values of the magnetic field H, the radial gradient G and the z component of H, i.e., Hz of that field relative to the adjacent current direction and the tool's longitudinal axis at this location are readily computed using the law of Biot Savart.

This apparatus includes a mechanism for controllably rotating the roll angle of the tool about its longitudinal axis and also for rotating the longitudinal axis about a perpendicular axis, which lies in the plane of the loop and is perpendicular to H0, the electromagnetic field at the center of the tool. This apparatus, and particularly the electromagnetic field which is generated in the vicinity of the tool being calibrated, are closely related to that present while drilling. In the SAGD application where the drilling wellbore and the target wellbore are above each other, the plane of the wells is vertical rather than horizontal as in the calibration apparatus. The tool matrix TlMat is found using this calibration apparatus by noting the tool response to an ensemble of tool orientations which simulate those expected in drilling operations. The tool matrix TlMat can be computed from sets of measurements which constitute an ensemble. In block C, an alternating current is forced to flow in the calibration loop, and in block D, measurements related to the current are recorded. A set of measurements "i", i.e., V1$i$, V2$i$, V8$i$, VZi results from a known set of parameters H, G, Atri, and ACurZi. Following the general formulation, the results V1$i$, V2$i$, V8$i$, VZi for a given member of the ensemble are given by (note that Hzi=H0*sin(ACuri)):

$$|V1i \ V2i \ldots V8i \ VZi| = |H^*\cos(Atri)H^*\sin(Atri)G^*\cos(2^*Atri)G^*\sin(2^*Atri)H^*\sin(ACuri)|^*\text{TlMat} \qquad \text{Eq. 15}$$

The entire ensemble of calibration measurements can be entered into matrices shown below, i.e., $$\begin{vmatrix} V11 & V21 & \ldots & V81 & VZ1 \\ V12 & V22 & \ldots & V82 & VZ2 \\ \ldots & & & & \\ \ldots & & & & \\ V1n & V2n & \ldots & V8n & VZn \end{vmatrix} \qquad \text{Eq. 16}$$

$*T1Mat$, represented as:
$MeasMat = CalParMat$ $$\begin{vmatrix} H*\cos(Atr1) & H*\sin(Atr1) & G*\cos(2*Atr1) & G*\sin(2*Atr1) \\ H*\sin(ACur1) & & & \\ H*\cos(Atr2) & H*\sin(Atr2) & G*\cos(2*Atr2) & G*\sin(2*Atr2) \\ H*\sin(ACur2) & & & \\ \ldots & & & \\ \ldots & & & \\ H*\cos(Atrn) & H*\sin(Atrn) & G*\cos(2*Atrn) & G*\sin(2*Atrn) \\ H*\sin(ACurn) & & & \end{vmatrix}$$

$*T1Mat$

The Tool Matrix TlMat can be found using a least squares fit from Eq. 16 as:

$$\text{TlMat} = \text{inv}(\text{CalParMat}'^*\text{CalParMat})^*\text{CalParMat}'^*\text{MeasMat} \qquad \text{Eq. 17.}$$

A convenient ensemble choice for the parameters in the CalParMat is to make 36 measurements of the quantities V1 . . . V8, VZ. The current in the calibrating loop 400 is held fixed at a value to make the electromagnetic field at the sensing instruments comparable to or slightly larger than expected during drilling operations. Thus, the value of H and G are held fixed. During the first 12 measurements, i.e., for i=1 . . . 12, ACurZ is held fixed at say −5 degrees and the tool angle Atr is longitudinally varied in 30 degree increments i.e., 0, 30, 330 degrees, as illustrated at block E. For the next 12 measurements, i.e., i=13 . . . 24 the tool axis angle ACurZ is axially rotated and set to 0 degrees and Atr is again varied through the 0, 30 . . . 330 sequence. For the final 12 measurements, i.e., for i=25 . . . 36 ACurZ is set to +5 degrees and Atr is again varied through the 0, 30 . . . 330 degree sequence. Thus, by noting the tool responses V1 . . . V8,VZ to each of the above longitudinal and axial rotational orientations of the tool, the required numbers which constitute the Calibration Parameter Matrix (CalParMat) and the Measurement Matrix (MeasMat) above are generated.

Utilizing the results of foregoing procedures, in block G, the parameters of the electromagnetic gradient field instrument are determined in an optimal way. This method, using Eq. 14, determines the RecoveryMatrix (RecMat) from TlMat which gives a simple and direct way to determine the required radial distance parameter R and the roll angle Atr, i.e., the angle between the tool reference direction and the vector to the target wellbore. The roll angle Atr is readily combined with the standard MWD measurement of the tool roll, inclination and azimuth angles in space using the principles of vector addition to give the direction in space to the target wellbore from the injecting wellbore.

Figure 6:
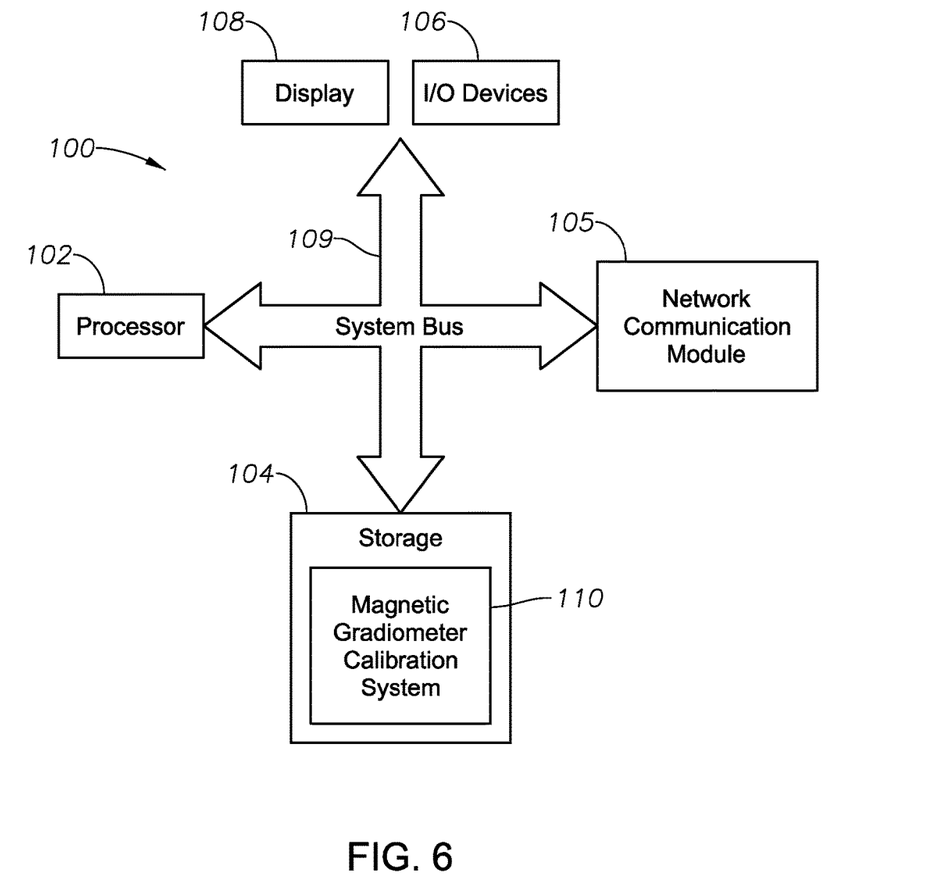
FIG. 6 is a block diagram of a computer system for implementing the magnetic gradiometer calibration system, according to certain illustrative embodiments of the present disclosure.

FIG. 6 is a block diagram of an exemplary computer system 100 adapted for implementing the magnetic gradiometer calibration system as described herein. In one embodiment, the computer system 100 includes at least one processor 102, a non-transitory, computer-readable storage 104, an optional network communication module 105, optional I/O devices 106, and an optional display 108, and all interconnected via a system bus 109. To the extent a network communications module 105 is included, the network communication module 105 is operable to communicatively couple the computer system 100 to other devices over a network. In one embodiment, the network communication module 105 is a network interface card (NIC) and communicates using the Ethernet protocol. In other embodiments, the network communication module 105 may be another type of communication interface such as a fiber optic interface and may communicate using a number of different communication protocols.

It is recognized that the computer system 100 may be connected to one or more public (e.g. the Internet) and/or private networks (not shown) via the network communication module 105. Such networks may include, for example, servers upon which actual or modeled wellbore ranging data other data needed for the calibration as described herein is stored. Software instructions executable by the processor 102 for implementing the magnetic gradiometer calibration system 110 in accordance with the embodiments described herein, may be stored in storage 104. It will also be recognized that the software instructions comprising the magnetic gradiometer calibration system 110 may be loaded into storage 104 from a CD-ROM or other appropriate storage media.

In certain illustrative embodiments, computer system 100 is utilized to implement at least a portion of the methods described herein. For example, computer system 100 is preferably utilized to generate calibration matrices, perform the least squares fit operations and determine the Tool Matrix as described above.

Note again that the present disclosure may be utilized in a variety of applications, including SAGD applications. Other illustrative applications include, for example, applications for accurately, and reliably positioning a wellbore being drilled, the "relief/intersecting" wellbore (i.e., second wellbore), with respect to a nearby target first wellbore, usually the blowout wellbore, so that the second wellbore intersects or avoids the target wellbore as desired. The target wellbore must be of a higher conductivity than the surrounding formation, which may be realized through the use of an elongated conductive body along the target wellbore, such as, for example, casing that is already present in most wells to preserve wellbore integrity.

The methods and systems of this disclosure are also particularly desirable for the drilling of relief wells and/or wellbore avoidance operations. In a wellbore avoidance application, a wellbore is drilled utilizing the system described herein, which actively searches for other wells (or other conductive elongated structures), in the drilling path. If such wells or structures are detected, the positioning system alters the drill path accordingly. These and other applications and/or adaptations will be understood by those ordinarily skilled in the art having the benefit of this disclosure.

Thus, a system for determining distance and direction to a target wellbore from a second wellbore being drilled has been described. Embodiments of the system may generally include a conductive body disposed in at least a portion of the target wellbore; a drill string in the wellbore being drilled, the drill string having multiple drill pipe sections connected end-to-end and carrying a measurement while drilling system; an electric current supply disposed to excite a current flow on the target wellbore by a direct electrical connection to the target wellbore; and an electromagnetic field sensing instrument in the second wellbore being drilled, the electromagnetic field sensing instrument being responsive to the electromagnetic field and to radial gradients of the electromagnetic field generated by the electrical current in the target wellbore.

Likewise, embodiments of well ranging systems have been described. Embodiments of the system may generally include a first wellbore having a wellhead at the surface of a formation with an elongated wellbore extending from the wellhead, the wellbore characterized by a proximal end adjacent the wellhead and a distal end, wherein the wellbore includes an elongated conductive body disposed therein; a source of alternating current at the surface, the source comprising emitter and return electrodes; a second wellbore having an elongated wellbore extending from the surface; a pipe string disposed in the second wellbore; and a magnetic measurement device carried by the pipe string.

Other embodiments of the well ranging system may generally include a first wellbore having a wellhead at a surface of a formation with an elongated wellbore extending from the wellhead, the wellbore characterized by a proximal end adjacent the wellhead and a distal end, wherein the wellbore includes an elongated conductive body disposed therein; a second wellbore having a an elongated wellbore extending from the surface; a pipe string disposed in the second wellbore; a source of alternating current, the source comprising an emitter and a return electrode, wherein the emitter and return electrodes are disposed in the second wellbore along the pipe string; and a magnetic gradiometer carried by the pipe string, wherein the current source generates an electric current that is transmitted from the emitter, and wherein the magnetic gradiometer is configured to respond to a magnetic gradient induced by a current flowing in the conductive body in the first wellbore.

Additionally, embodiments of a wellbore tool for locating a target wellbore containing a conductive body from a second wellbore has been described. The wellbore tool may generally include an electric current source comprising an emitter and a return electrode; and a magnetic gradiometer, wherein the current source generates an electric current that is transmitted from the emitter, and wherein the magnetic gradiometer responds to a magnetic gradient induced by a current flowing along the conductive body in the target wellbore. Moreover, any one of the following elements, alone or in combination with each other, may be combined with any of the foregoing embodiments:

The electric current supply comprises a time varying current.

The electromagnetic field sensing instrument comprises an array of electromagnetic sensors, each electromagnetic sensor positioned within the second wellbore at a location and responsive to the electromagnetic field at its location.

The conductive body is a casing string disposed in the target wellbore.

Electromagnetic sensors are positioned in the second wellbore so that the electromagnetic field sensing instrument is responsive to gradients in the radial direction of a time varying magnetic field.

The direct electrical connection comprises a wire extending from the second wellbore to the target wellbore.

The direct electrical connection comprises an electrode at an earth surface.

The time varying current comprises a low frequency alternating current.

The electromagnetic field sensing instrument comprises a first board and a second board spaced apart from one another along a primary axis of the sensing instrument, wherein each board comprises a plurality of sensors spaced apart from one another symmetrically about a center axis of the board.

Each board of an electromagnetic field sensing instrument comprises four sensors disposed at 90° from one another around the axis of the board.

The electromagnetic field sensing instrument comprises a first board and a second board spaced apart from one another along a primary axis of the sensing instrument and an additional sensor spaced apart from the boards.

An additional sensor is perpendicular to the sensors of boards of the sensing instrument and parallel to the primary axis of the sensing instrument.

A second board of the sensing instrument is rotated so that sensors of the second board are at an angle of 45° relative to sensors of a first board.

The electromagnetic field sensing instrument is housed in a sensor sub, the sensor sub has an outer housing of uniform wall thickness.

The electromagnetic field sensing instrument is housed in a sensor sub and wherein the sensor sub has a central core which has an electrically insulating gap.

Thus, a method for determining distance and direction to a first target wellbore from a second wellbore being drilled has been described. The target wellbore extending from the surface of a formation and containing a conductive body disposed therein. Embodiments of the method may generally include producing an alternating current flow on the target wellbore by direct electrical connection of the conductive body to an AC power supply; and taking multiple measurements of magnetic field data at selected depth intervals utilizing an electromagnetic gradient field instrument disposed in the second wellbore. Likewise, embodiments of method for performing steam assisted gravity drainage to recover hydrocarbons from a formation have been described. Embodiments of this method may generally include producing an alternating current flow on a first target wellbore by direct connection of a conductive body in the target wellbore to an AC power supply; taking multiple measurements of magnetic field data at selected depth intervals utilizing an electromagnetic gradient field instrument disposed in a second wellbore; injecting steam in the second wellbore to cause hydrocarbons in the formation to migrate to the first wellbore; and recovering hydrocarbons from the first wellbore. Moreover, any one of the following, alone or in combination with each other, may be combined with any of the foregoing embodiments:

- A response of the sensing instrument is used to determine the distance from the borehole being drilled.
- The electromagnetic field sensing instrument determines a relative azimuthal direction of the target well to the wellbore being drilled.
- The sensing instrument determines a relative angle between the direction of the wellbore being drilled and the target well.
- A response of the sensing instrument is used to determine the distance from the borehole being drilled and the distance is determined using a matrix of numbers which characterize the electromagnetic field sensing instrument response to the electromagnetic field and radial gradient thereof in the vicinity of the sensing instrument.
- The measurements comprise magnitude, direction and radial gradient of the magnetic field produced by the current flow on the target wellbore.
- Measuring, in the wellbore being drilled, the magnitude and a direction of Earth's field and of a direction of gravity.
- The alternating current is a low frequency.
- The frequency of the alternating current is between approximately 1 to 30 Hertz.
- Initiating drilling of the second wellbore, and, interrupting drilling while taking measurements.
- Positioning an electrode in the target wellbore.
- Connecting an electrode to the target wellbore at the surface.
- Connecting an electrode to the conductive body at a location downhole from the surface.
- Deploying an insulating section in the conductive body uphole from the location of the direction electrical connection of the conductive body.
- Detecting, in the wellbore being drilled, a radial gradient of the magnetic field.
- The current is between approximately 5 and 30 amperes rms.
- Computing the angle between the roll angle of the instrument and the target wellbore and computing the distance between wellbore being drilled and the target wellbore.
- Drilling the second wellbore; measuring electromagnetic field gradient; and continuing to drill the second wellbore based on the measured electromagnetic field gradient.

Thus, a method for calibrating an electromagnetic gradient field instrument has been described. The electromagnetic gradient field instrument is characterized by an elongated, longitudinal axis. Embodiments of the method may generally include providing an electrically conductive calibrating loop with a select shape disposed in a plane; positioning an electromagnetic gradient field instrument adjacent the calibrating loop so that the longitudinal axis has a first orientation relative to the calibrating loop and is disposed within the plane of the calibrating loop; inducing an alternating current in the calibrating loop; using the electromagnetic gradient field instrument to measure an electromagnetic field generated by current in the calibration loop while the instrument is in the first orientation; longitudinally rotating the electromagnetic gradient field instrument about a point on the elongated, longitudinal axis within the plane of the loop to a second orientation; using the electromagnetic gradient field instrument to measure the electromagnetic field generated by current in the calibration loop while the instrument is in the second orientation; and repeating the longitudinally rotating and measuring for a plurality of orientations to generate measurement data. Moreover, any one of the following, alone or in combination with each other, may be combined with any of the foregoing embodiments:

- The calibrating loop is a square, planar loop.
- A square planar loop comprises legs approximately 30 meters long.
- Estimating the frequency and current magnitude expected during drilling of wellbore; and utilizing the estimated frequency and current in the step of inducing.
- Holding the alternating current at a fixed value.
- The instrument is longitudinally rotated approximately 30° during each incremental measurement.
- The instrument is incrementally longitudinally rotated through 360°.
- Following repeating the longitudinal rotating and measuring, the method further comprising axially rotating the tool about the elongated longitudinal axis and repeating the steps of longitudinally rotating and measuring.
- Utilizing the measurement data to generate a voltage matrix; generating a calibration parameter matrix utilizing orientation and magnetic field vector data; applying a least squares fit to the resulting matrix to determine a tool matrix.
- Adjusting one or more parameters of the electromagnetic gradient field instrument based on the tool matrix.

Moreover, the methods described herein may be embodied within a system comprising processing circuitry to implement any of the methods, or a in a computer-program product comprising instructions which, when executed by at least one processor, causes the processor to perform any of the methods described herein.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A system for determining distance and direction to a target wellbore from a second wellbore being drilled, the system comprising:
    a conductive tubular string disposed in at least a portion of the target wellbore;
    a drill string in the wellbore being drilled, the drill string carrying a measurement while drilling system;
    an electric current supply disposed to excite a current flow on the target wellbore by a direct electrical connection to the conductive tubular string in the target wellbore;
    an electromagnetic field sensing instrument in the second wellbore being drilled, the electromagnetic field sensing instrument including an array of electromagnetic sensors having at least two radially separated sensors being responsive to the electromagnetic field and to radial gradients of the electromagnetic field generated by the electrical current in the target wellbore; and
    a processor operably coupled to the at least two radially separated sensor for computing the radial gradients of the magnetic field.

2. The system of claim 1, wherein the electric current supply comprises a time varying current.

3. The system of claim 2, wherein each electromagnetic sensor positioned within the second wellbore at a location and responsive to the electromagnetic field at its location.

4. The system of claim 2, the conductive tubular string is a casing string disposed in the target wellbore.

5. The system of claim 3, wherein the electromagnetic sensors are positioned in the second wellbore so that the electromagnetic field sensing instrument is responsive to gradients in the radial direction of a time varying magnetic field.

6. The system of claim 4, wherein the direct electrical connection comprises a wire extending from the second wellbore to the target wellbore.

7. The system of claim 4, wherein the direct electrical connection comprises an electrode at an earth surface.

8. The system of claim 2, wherein the time varying current comprises a low frequency alternating current.

9. The system of claim 1, wherein the electromagnetic field sensing instrument comprises a first board and a second board spaced apart from one another along a primary axis of the sensing instrument, wherein each board comprises a plurality of sensors spaced apart from one another symmetrically about a center axis of the board.

10. The system of claim 9, wherein each board comprises four sensors disposed at 90° from one another around the axis of the board.

11. The system of claim 10, further comprising an additional sensor spaced apart from the boards.

12. The system of claim 11, wherein the additional sensor is perpendicular to the sensors of the boards and parallel to the primary axis of the sensing instrument.

13. A system for determining distance and direction to a target wellbore from a second wellbore being drilled, the system comprising:
    a conductive body disposed in at least a portion of the target wellbore;
    a drill string in the wellbore being drilled, the drill string carrying a measurement while drilling system;
    an electric current supply disposed to excite a current flow on the target wellbore by a direct electrical connection to the target wellbore;
    an electromagnetic field sensing instrument in the second wellbore being drilled, the electromagnetic field sensing instrument being responsive to the electromagnetic field and to radial gradients of the electromagnetic field generated by the electrical current in the target wellbore, wherein the electromagnetic field sensing instrument comprises a first board and a second board spaced apart from one another along a primary axis of the sensing instrument, wherein each board comprises a plurality of sensors spaced apart from one another symmetrically about a center axis of the board, wherein each board comprises four sensors disposed at 90° from one another around the axis of the board, and wherein the second board is rotated so that the sensors of the second board are at an angle of 45° relative to the sensors of the first board.

14. The system of claim 1 wherein the electromagnetic field sensing instrument is housed in a sensor sub, the sensor sub has an outer housing of uniform wall thickness and wherein the sensor sub has a central core which has an electrically insulating gap.

15. A method for determining distance and direction to a first target wellbore from a second wellbore being drilled, the target wellbore extending from the surface of a formation and containing a conductive tubular string disposed therein, the method comprising:
    producing an alternating current flow on the target wellbore by direct electrical connection of the conductive tubular string to an AC power supply;
    taking multiple measurements of magnetic field data at selected depth intervals utilizing an electromagnetic gradient field instrument disposed in the second wellbore; and
    computing, from the measurements of magnetic field data, a radial gradient of a magnetic field generated by the alternating current flow on the target wellbore.

16. The method of claim 15, wherein the measurements comprise magnitude and direction of the magnetic field produced by the current flow on the target wellbore.

17. The method of claim 15, further comprising measuring, in the wellbore being drilled, the magnitude and a direction of Earth's field and of a direction of gravity.

18. The method of claim 15, wherein the alternating current is a low frequency.

19. The method of claim 18, wherein the frequency is between approximately 1 to 30 Hertz.

20. The method of claim 15, further comprising initiating drilling of the second wellbore; and, interrupting drilling while taking measurements.

21. The method of claim 15, wherein producing the current comprises positioning an electrode in the target wellbore.

22. The method of claim 15, wherein producing the current comprises connecting an electrode to the target wellbore at the surface.

23. The method of claim 15, wherein producing a current comprises connecting an electrode to the conductive tubular string at a location downhole from the surface.

24. The method of claim 15, further comprising deploying an insulating section in the conductive tubular string uphole from the location of the direction electrical connection of the conductive tubular string.

25. The method of claim 15, wherein taking the measurements comprise detecting, in the wellbore being drilled, a radial gradient of the magnetic field.

26. The method of claim 15, wherein the current is between approximately 5 and 30 amperes rms.

27. The method of claim 15, further comprising the step of computing the angle between the roll angle of the instrument and the target wellbore and computing the distance between wellbore being drilled and the target wellbore from the radial gradient.

28. The method of claim 15, further comprising conducting SAGD operations utilizing the multiple measurements of magnetic field data.

\* \* \* \* \*

UNITED STATES PATENT AND TRADEMARK OFFICE
CERTIFICATE OF CORRECTION

| | | |
|---|---|---|
| PATENT NO. | : 10,132,157 B2 | Page 1 of 1 |
| APPLICATION NO. | : 14/647748 | |
| DATED | : November 20, 2018 | |
| INVENTOR(S) | : Arthur F. Kuckes | |

It is certified that error appears in the above-identified patent and that said Letters Patent is hereby corrected as shown below:

In the Specification

Column 10, Line 36, change "RecMat=T1Mat'*inv(T1Mat*T1Mat)" to
-- RecMat=T1Mat'*inv(T1Mat*T1Mat') --

Signed and Sealed this
Fourteenth Day of May, 2019

Andrei Iancu
*Director of the United States Patent and Trademark Office*